United States Patent [19]
Guevel et al.

[11] Patent Number: 4,749,375
[45] Date of Patent: Jun. 7, 1988

[54] METHOD FOR PRODUCING A MULTIPLE V-GROOVE PULLEY AND A PULLEY PRODUCED BY SAID METHOD

[75] Inventors: Guy Guevel; Louis Dutresne; Herve Foucher, all of Auxi Le Chateau, France

[73] Assignee: Aubecq Auxi S.A., Auxi Le Chateau, France

[21] Appl. No.: 948,465

[22] Filed: Dec. 31, 1986

Related U.S. Application Data

[63] Continuation of Ser. No. 663,458, Oct. 22, 1984, abandoned.

[30] Foreign Application Priority Data

Oct. 21, 1983 [FR] France .................. 83 16814

[51] Int. Cl.$^4$ .................. F16H 55/36; F16H 55/49
[52] U.S. Cl. .................. 474/170; 24/159 R
[58] Field of Search .......... 474/169, 170; 29/159 R, 29/159.01; 72/68, 71, 109, 325

[56] References Cited

U.S. PATENT DOCUMENTS

| | | | |
|---|---|---|---|
| 619,197 | 2/1899 | Malam | 72/109 |
| 3,540,395 | 11/1970 | Skinner | 72/325 X |
| 4,078,410 | 3/1978 | Lemmo | 29/159 R X |
| 4,388,817 | 6/1983 | Victor | 72/68 |

FOREIGN PATENT DOCUMENTS

| | | |
|---|---|---|
| 2254383 | 7/1975 | France . |
| 2261459 | 12/1975 | France . |
| 2488534 | 2/1982 | France . |
| 2507931 | 12/1982 | France . |
| 134268 | 8/1983 | Japan .................. 474/170 |
| 58-77729 | 9/1983 | Japan . |

*Primary Examiner*—James A. Leppink
*Assistant Examiner*—Thuy M. Bui
*Attorney, Agent, or Firm*—Wenderoth, Lind & Ponack

[57] ABSTRACT

A flat disc 1 having a central aperture is deformed on its periphery by spin-forming the metal of the disc so that the metal projects from each side of the plane of the disc and thereby forms a cylindrical rim 6 which is parallel to the axis of the disc. One or a plurality of series of V-grooves 8 are then formed on the outer surface of the rim. The metal is spin-formed in such manner as to cause it to be laterally extruded thereby forming a rim which has a definite thickness independent of the thickness of the initial disc constituting the web of the pulley.

9 Claims, 1 Drawing Sheet

METHOD FOR PRODUCING A MULTIPLE V-GROOVE PULLEY AND A PULLEY PRODUCED BY SAID METHOD

This application is a continuation, of now abandoned aplication Ser. No. 663,458, filed Oct. 22, 1984.

Pulleys having multiple V-grooves comprise at the present time a cylindrical rim on the outer surface of which are formed the V-grooves and which is rigid with a web connecting it to a hub. These pulleys are usually produced from a press-formed sheet of metal so that they have a relatively thin wall thickness and the hub must be added by welding, which is costly.

Further, as the web of the pulley is offset relative to the belt tension region, fractures are liable to occur at the base of the pulley.

Moreover, the cup shape of these pulleys does not allow these pulleys to be used in certain devices owing to difficulties of assembly or overall size.

An object of the present invention is to overcome these drawbacks by providing a production method which produces multiple V-groove pulleys, or multi V-pulleys, comprising a central web and having, as desired, no hub, a hub in a single piece, or an added hub, which satisfy requirements of lightness and strength in use.

The invention therefore provides a method for producing a pulley having a plurality of V-grooves, said method comprising starting with a flat circular disc, and spin-forming said disc so as to urge the peripheral portion of said disc on each side of its general plane and form a cylindrical rim coaxial with the disc and projecting from each side of a central web, and forming at least one series of V-grooves in the outer surface of the cylindrical rim.

The initial disc may easily have sufficient thickness to permit forming a hub directly thereon. On the other hand, risk of fracture under the action of an offset tension is slight while the assembly of the pulley is facilitated.

According to a preferred embodiment, the metal of the peripheral portion of the disc is spin-formed by contact with rollers which cause it to be extruded on each side of the plane of the disc, and the cylindrical rim has a definite thickness which is independent of the thickness of the web of the pulley.

By suitably choosing the diameter and thickness of the initial disc, it is possible to obtain not only pulleys of varying diameter and thickness, but also pulleys having cylindrical rims of different heights capable of receiving one or more series of V-grooves.

According to a modification, the initial disc is split on its periphery in a plane perpendicular to its axis and the two lips of the split are spin-formed or urged back in opposite directions and in the extension of each other so as to form a cylindrical rim projecting from each side of the central web, which rim receives the V-grooves.

In this case, as in the preceding case, the pulley obtained has a central web which is in one piece with a peripheral cylindrical rim which extends from each side of this web and has a thickness different from the thickness of said web.

The following description of embodiments given by way of non-limiting examples, and shown in the accompanying drawings, will bring out the features and advantages of the invention.

Figure 1:
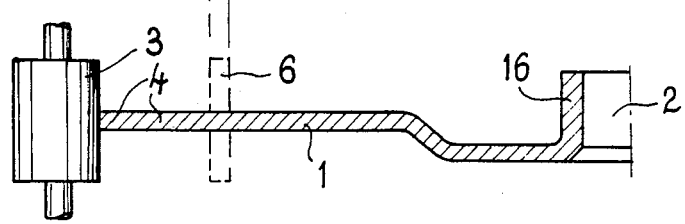
FIG. 1 is a diagrammatic radial sectional view of a flat disc already provided with a hub before the disc is deformed.

As shown in FIG. 1, a pulley according to the invention is made from a flat sheet metal disc 1 having a diameter distinctly larger than that of the pulley to be produced. The disc 1 has a central aperture 2 and constitutes the web of the pulley which may be connected to a hub.

The disc 1 is mounted on a rotating support between cylindrical forming rollers 3 which bear against the outer edge 4 of the disc. As these rollers and the disc 1 undergo a relative displacement, the metal of the peripheral portion of the disc flows or is extruded both upwardly and downwardly and projects from each side of the central web 1. A regular cylindrical rim is formed which is symmetrical relative to the general plane of the initial disc 1, as shown in dotted-lines at 6 in FIG. 1.

A series of V-grooves 8 are then formed by any suitable means, and preferably by other forming rollers, in the outer surface 10 of the rim 6 so as to give the pulley 12 its final shape.

It will be understood that the travel and the dimension of the roller are so chosen as to impart to the rim 6 the axial height necessary for forming the grooves.

Figure 2:
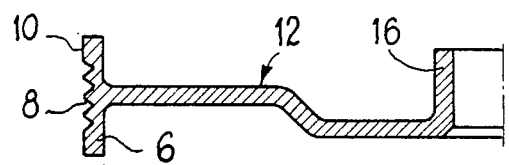
FIG. 2 is a view similar to FIG. 1 of a finished pulley.
Figure 3:
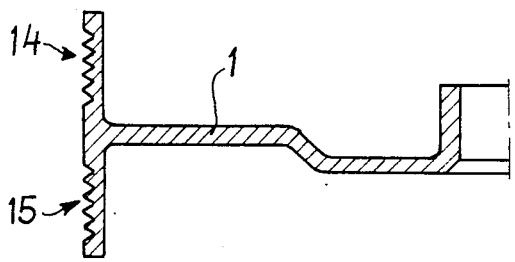
FIG. 3 is a view similar to FIG. 1 of a pulley having a plurality of series of grooves.

As shown in FIGS. 2 and 3, the pulley may have a single series of grooves 8 or may have more grooves, for example two series 14, 15 of grooves each of which is formed on one of the flanges of the cylindrical rim 6.

The pulley can then receive a plurality of belts which preferably act in a symmetrical manner on each side of its central web.

Further, it will be observed that it is possible with this method to produce pulleys having a small diameter just as well as larger pulleys.

Moreover, the flow or extrusion of the metal under the action of the rollers 3 gives to the rim 6 a thickness which is distincly greater than the thickness of the initial disc, so that, for example, a disc of sheet metal having a thickness of 2 mm permits the obtainment of a pulley whose rim 6 has a thickness of 4 mm. Such a difference ensures an optimum utilization of the material, since the thickness of the rim facilitates the forming of the grooves while the thinner web renders the whole of the pulley lighter. This difference is however determined by the desired features and type of use. In particular, a very thin web is preferred when it must be assembled with an added hub, while a thicker web permits the forming of the hub in the disc itself, as shown in FIGS. 1 to 3. The hub 16 is in the last-mentioned case preferably formed in the centre of the disc 1 in the course of a prior stage of the method and the finished pulley has the big advantage of being completely in a single piece.

Figure 4:
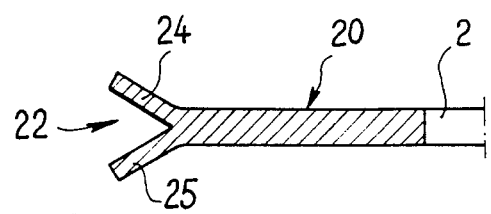
FIGS. 4 and 5 are similar views illustrating two stages in a modification of the method for producing the pulley.
Figure 5:
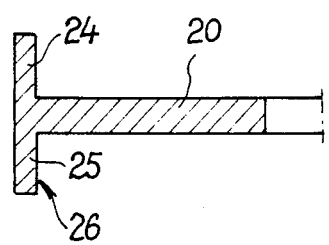

According to a modification, which is particularly of utility when a pulley is required which has a relatively thick web, which is in particular the case when it is desired to form the hub directly in the initial disc, but which is also adapted to other types of pulley, as shown by FIGS. 4 and 5, the disc 20 is first of all split in a direction perpendicular to its axis at 22, in it peripheral portion, so as to form two lips 24,25 each of which has a thickness which is one half of the thickness of the initial disc or of the centre web. The lips 24 and 25 are then urged back or spin-formed by means of forming rollers, in opposite directions and in the extension of each other, so as to form a cylindrical rim 26 projecting from each side of the web 20. One or more series of V-grooves are then formed in the outer surface of this rim, in the same way as in the rim 6.

As before, the finished pulley has great strength and a good balance and is easy to mount in the most diverse types of apparatus and in particular on motor-vehicles. Its weight and overall size are however greater owing to the distinctly thicker web 20. Its production remains simple and is also carried out with no need for a press-forming operation or removal of material.

What is claimed is:

1. A method for producing a metal pulley having a cylindrical rim provided with a plurality of V-grooves, said method comprising in combination: starting with a flat circular disc having an axis and a diameter which is larger than the required outside diameter of the rim to an extent to provide the required amount of material for producing the desired radial thickness of the cylindrical rim, spin-forming a peripheral portion of this disc by rotating the disc about said axis whle urging at least one rotatable roller having an axis of rotation parallel to said axis against the entire thickness of the peripheral portion of the disc, said roller having a generally cylindrical-shaped part which is urged against the disc and has an axial extent exceeding the thickness of the disc so as to flow the metal of the disc on each side of a general plane of the disc until the cylindrical rim is formed which is coaxial with the disc and projects from each side of the disc which constitutes a central web of the pulley, and providing in an outer surface of the cylindrical rim at least one series of V-grooves.

2. A method according to claim 1, comprising giving a radial thickness to the cylindrical rim which is different from the thickness of the central web.

3. A pulley in a single piece comprising in combination: an axis of rotation, a central web, a cylindrical rim which defines an outer surface and projects on each side of the central web, and at least one series of grooves in said outer surface of the rim, the web being in the form of a disc having any thickness relative to the thickness of the rim and a portion of the pulley including the rim and the adjacent part of the disc having a structure of the material of the disc which is the result of flowing the material of the disc by rotating the disc about said axis while urging at least one rotatable roller having an axis of rotation parallel to said axis against the entire thickness of the peripheral portion of the disc, said roller having a generally cylindrical-shaped part which is urged against the disc and has an axial extent exceeding the thickness of the disc.

4. A pulley according to claim 3, wherein the thickness of the rim carrying the grooves is greater than the thickness of the web.

5. A pulley according to claim 3, wherein the thickness of the rim carrying the grooves is less than the thickness of the web.

6. A pulley according to claim 3, comprising a plurality of series of V-grooves on the outer surface of the rim.

7. A pulley according to claim 3, wherein said grooves are of the type resulting from a rolling operation.

8. A method according to claim 1, wherein said grooves are rolled into the outer surface of the cylindrical rim.

9. A method according to claim 1, wherein a hub is previously formed in the centre of the disc and is in one piece with the disc.

* * * * *